United States Patent [19]

Freeman et al.

[11] Patent Number: 5,661,284

[45] Date of Patent: Aug. 26, 1997

[54] COMMERCIAL TRANSACTION SYSTEM

[75] Inventors: Albert J. Freeman, 531 Silverado Dr., Tiburon, Calif. 94920-1920; James F. Hann, Piedmont, Calif.

[73] Assignee: Albert J. Freeman, Tiburon, Calif.

[21] Appl. No.: 525,443

[22] Filed: Sep. 8, 1995

Related U.S. Application Data

[63] Continuation-in-part of Ser. No. 402,741, Mar. 13, 1995.

[51] Int. Cl.⁶ .................................................. G06K 5/00
[52] U.S. Cl. ........................ 235/380; 235/379; 380/25; 902/4
[58] Field of Search ................................ 380/23, 24, 25; 902/4; 235/379, 380, 462

[56] References Cited

U.S. PATENT DOCUMENTS

| | | | |
|---|---|---|---|
| 4,682,794 | 7/1987 | Margolin | 283/82 |
| 4,802,218 | 1/1989 | Wright et al. | 380/23 |
| 4,838,792 | 6/1989 | Hoyeck | 434/163 |
| 4,972,476 | 11/1990 | Nathans | 380/23 |
| 5,056,141 | 10/1991 | Dyke | 380/25 |
| 5,159,635 | 10/1992 | Wang | 380/51 |
| 5,178,418 | 1/1993 | Merry et al. | 383/73 |
| 5,243,655 | 9/1993 | Wang | 380/51 |
| 5,313,564 | 5/1994 | Kafri et al. | 385/35 |
| 5,337,358 | 8/1994 | Axelrod et al. | 235/380 X |
| 5,337,361 | 8/1994 | Wang et al. | 380/51 |
| 5,450,491 | 9/1995 | McNair | 235/380 K |

FOREIGN PATENT DOCUMENTS

| | | | |
|---|---|---|---|
| 4203748 | 8/1993 | Germany | 235/380 |
| 57-29173 | 2/1982 | Japan | 235/380 |
| 60-19279 | 1/1985 | Japan | 235/380 |
| 0226796 | 9/1988 | Japan | 235/494 |
| 0314685 | 12/1988 | Japan | 235/494 |
| 1-261799 | 10/1989 | Japan | 235/380 |
| 0172987 | 7/1991 | Japan | 235/494 |

OTHER PUBLICATIONS

Mark Maremont, "A Magnetic Mug Shot on your Credit Card?" excerpt from article in Business Week, Apr. 24, 1995.

Valerie Block, "Kodak System Compresses Photo To A Security Code for Card Stripe", American Banker, Mar. 31, 1995.

*Primary Examiner*—Donald T. Hajec
*Assistant Examiner*—Michael G. Lee
*Attorney, Agent, or Firm*—Townsend and Townsend and Crew LLP

[57] ABSTRACT

A commercial transaction system (2) uses a multi-purposed credit/debit/identification card (8) having a randomly generated graphic card holder figurecode (10) uniquely corresponding to, but having no discernable relationship to, the card holder. The figurecode is visually discernable or it can be encoded by digital or analog means using magnetic, optical or magnetooptical media. A computer system (4) stores the graphic figurecode along with identification information of the card holder. A reader (14) is used to access the graphic figurecode for comparison with the stored electronic version in the computer system. An information terminal (18) is adapted to receive information from and, preferably, transmit information to, the computer system. Another aspect of the invention relates to using graphic product I.D. figurecodes (40) located in and/or around the product trademark instead of or in addition to barcodes to identify a chosen product (36), especially in conjunction with graphic trigger figurecodes (42) which prompt the collection and storage of point-of-sale information regarding the product.

33 Claims, 2 Drawing Sheets

COMMERCIAL TRANSACTION SYSTEM

CROSS REFERENCE TO RELATED APPLICATION

This is a continuation in part application of application Ser. No. 08/402,741 filed Mar. 13, 1995, the disclosure of which is incorporated by reference.

BACKGROUND OF THE INVENTION

Various types of commercial transaction cards, such as credit cards, debit cards and automatic teller cards, have nearly all of their information in alphanumeric form, often open to casual inspection by an observer. With conventional credit cards, all key information about the user is visible on the credit card: the user's name, credit card number, type of card, etc. The only thing which is not visible is a personal identification number (PIN) number, commonly used with cards such as calling cards and automatic teller cards. However, crooks often can obtain or determine PIN numbers so that even cards with PIN numbers are not all that secure. For example, PIN numbers can often be viewed by unscrupulous individuals watching users using an automatic teller machine, removing slips of paper with the PIN number on them, and punching in the PIN number, sometimes with the aid of a telescope. Sophisticated crooks can often obtain other specialized information, such as a user's mother's maiden name, to unlawfully use the credit card account. Thus, in many cases, using only visual access, most, if not all, information needed about a particular commercial transaction card can be obtained visually and then recorded for later use. Physical access to the card is not necessary.

SUMMARY OF THE INVENTION

The present invention is directed to a commercial transaction system in which all, or at least all important, information on a card is encoded in graphic form called a graphic card holder figurecode. The card holder figurecode uniquely corresponds to identification information relating to a card holder's credit card, debit card, or other commercial transaction device. The figurecode is preferably randomly or pseudo-randomly generated for the card holder and has no discernable relationship to the card holder. This helps substantially reduce the possibility of surreptitious copying of information regarding the card holder, such as the card holder's name, account number, type of card, expiration date, etc. While the information could be encrypted using alphanumeric characters, alphanumeric characters are much more easily copied than complex random or pseudo-random graphic figures; therefore graphic figurecodes using no alphanumeric characters are generally preferred.

In the preferred embodiment, the figurecode is a visually discernable, two-dimensional figurecode. The figurecode can also be encoded by digital or analog methods using, for example, magnetic media, such as magnetic strips, optical media, such as compact disks, magneteoptical media, such as re-writable optical disks, or other media as well. 25 The present invention will, however, be described in terms of visually discernable figurecodes for ease of understanding.

The commercial transaction system includes a commercial transaction device, such as a universal or multipurpose credit/debit/identification card, having a graphic card holder figurecode uniquely corresponding to the card holder. The system also includes a computer system configured to store the graphic card holder figurecode in an electronic form along with identification information for the card holder. A reader, typically at a point-of-sale, is used to access the graphic card holder figurecode and transform it into an electronic form for comparison with the stored electronic version of the card holder figurecode in the computer system. An information terminal, also typically at the point-of-sale, is adapted to receive information from and, preferably, transmit information to, the computer system.

One of the main features of the invention is the recognition that saving computer time in verifying the user is very important. Accordingly, the use of a graphic trigger figurecode, corresponding to a location in the computer system where the computer is instructed to start searching for the card holder figurecode, aids the searching process, thus saving search time. While the trigger figurecode is preferably a nonalphanumeric graphic trigger figurecode, it can be alphanumeric or a combination of alphanumeric and nonalphanumeric components. For example, assume that the computer system can store card holder figurecode information in one of ten million locations. By dividing the computer memory into one thousand different blocks of memory, the total number of possible locations for each figurecode within each block of memory is reduced from ten million to ten thousand. By directing the computer system to start searching at the particular block of memory containing the card holder's figurecode, a tremendous amount of search time by the computer is saved.

The invention can be carried out with the commercial transaction device being a simple credit card. In this case, the computer system would serve both be the identification verification function associated with the card holder figurecode and the transactional functions to store and manipulate transactional information associated with the credit card transaction. In other cases, the commercial transaction device could be a multifunction or universal card providing the user access to several accounts, such as two credit card accounts, a debit card account and a telephone calling card account. In this case, the computer system would typically include a verification computer system which would store the electronic version of the graphic card holder figurecode to verify the authenticity of the card holder figurecode typically scanned at the point-of-sale, and a number of different transactional computer systems, each transactional computer system associated with its corresponding credit card, debit card, etc. After validation of the card holder figurecode, together with any supplementary validation information such as mother's maiden name, PIN number, etc., the rest of the transaction would be handled by the transactional computer system for the associated transaction.

Another aspect of the invention relates to using graphic product identification (I.D.) figurecodes instead of or in addition to barcodes to identify a chosen product. This use of product I.D. figurecodes is especially useful in conjunction with the use of trigger figurecodes which prompt the collection and storage of point-of-sale information regarding the particular product.

An advantage of this aspect of the invention is that by incorporating the product I.D. figurecode into the region of the trademark of the product, much time searching for an out-of-the-way barcode, as is conventionally done, is eliminated. The clerk need merely find the trademark and scan that to enable the figurecodes to be read. Using one or more trigger figurecodes relating to point-of-sale information allows this information to be easily and automatically collected for the particular product. The type of information to be collected can be changed by the manufacturer according to what information is needed.

Other features and advantages of the invention will appear from the following description in which the preferred

DESCRIPTION OF THE PREFERRED EMBODIMENTS

Figure 1:
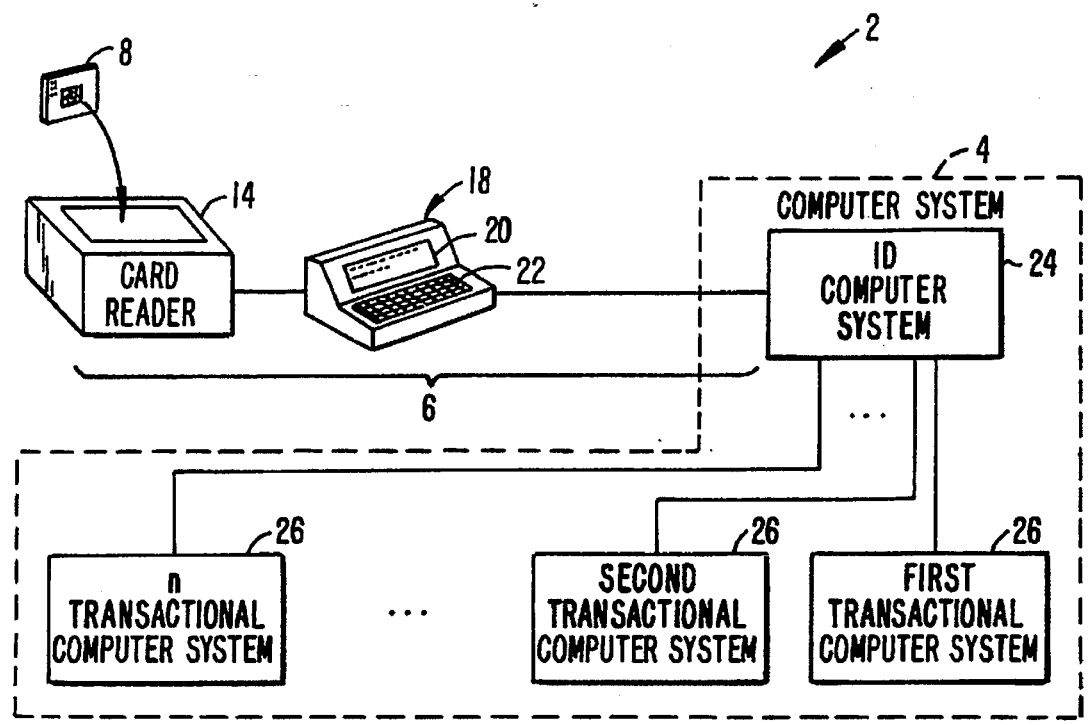
FIG. 1 is a simplified view showing a commercial transaction system made according to the invention.
Figure 2:
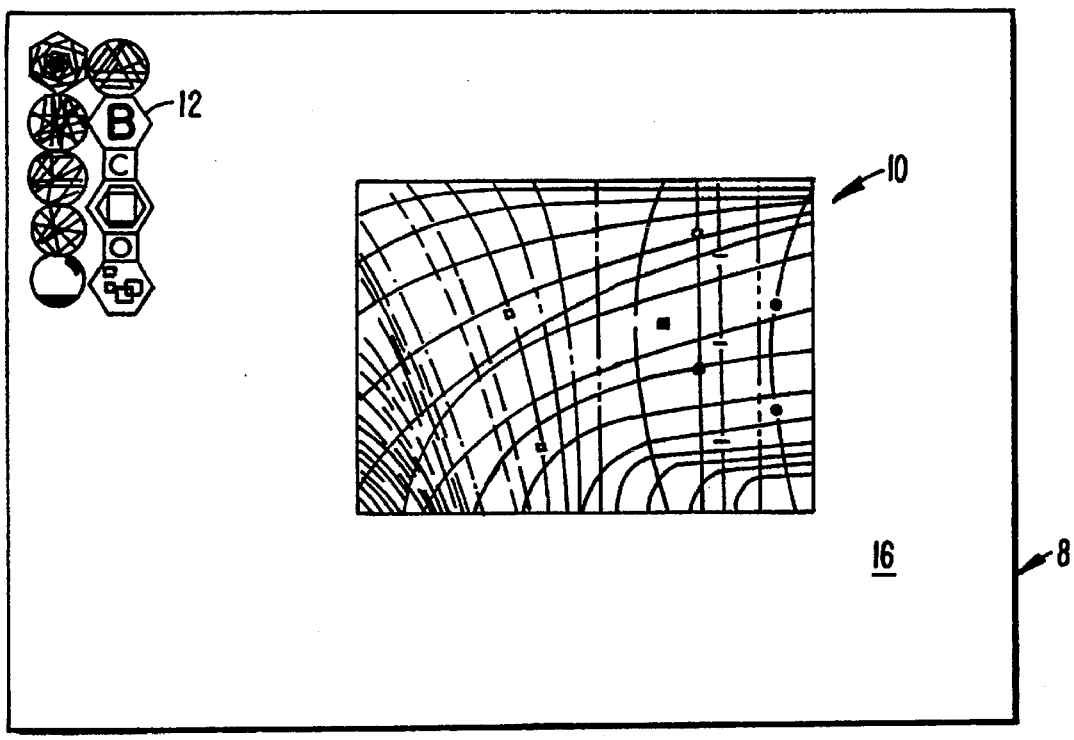
FIG. 2 shows the front of a multi-use commercial transaction card for use with the system of FIG. 1.

FIG. 1 shows a commercial transaction system 2 including a computer system 4 connected to a data link 6 adapted to read a commercial transaction card 8. One such card 8 is shown in FIG. 2 and takes the form of a multi-use commercial transaction card including a graphic card holder figurecode 10 which uniquely corresponds to the holder or owner of card 8. Figurecode 10 is preferably randomly or pseudo-randomly designed, generated or developed so that it has no discernable relationship to the holder of card 8. Typically, card holder figurecode 10 is generated randomly or pseudo-randomly using appropriate computer programs. Upon selection of a figurecode 10 for a particular card holder, screening is done to ensure that the card holder figurecode is not a duplicate or a near duplicate of the card holder figurecode for another card holder. Assuming figurecode 10 is sufficiently different from all other recorded figurecodes, an electronic version of figurecode 10 is stored in computer system 4 and is thereafter associated with the card holder's I.D. number and other identification information in the computer system. However, by using card 8, there would be no way for anyone to deduce the user's name, or any other information about the card or the card holder, just from looking at the card; this provides an additional level of security. Along an edge of card 8 are trigger figurecodes 12. Trigger figurecodes 12 help computer system 4 to narrow down the search to find the card holder figurecode 10 within its memory.

In the preferred embodiment, both card holder figurecode 10 and trigger figurecodes 12 are graphical and substantially non-alphanumeric. This is so they cannot be read and memorized merely by having an individual look at them. Actual access to card 8 would be required to copy graphic card holder figurecode 10. Trigger figurecodes 12 are not unique, but rather each set of graphic trigger figurecodes 12 for a particular card 8 identifies a particular starting location within the computer system 4 associated with the particular storage location of particular graphic card holder figurecode 10. However, graphic trigger figurecodes 12 are not unique and could be replaced by barcodes or even alphanumeric information since they do not transfer information about the card holder but rather only information about the general area within the computer at which the card holder figurecode 10 is stored. Other user verification information, in addition to the card holder's name, such as a PIN number or the mother's maiden name, can be also stored in conjunction with card holder figurecode 10.

Card 8 is typically used in a commercial transaction, such as to charge goods or services. To do so, data link 6 includes a card reader 14 configured to scan the face 16 of card 8 and transform the graphic information represented by card holder figurecode 10 and trigger figurecodes 12 into electronic versions of each. Data link 6 typically also uses an information terminal 18 to input information for use by computer system 4 and to receive information from computer system 4. For example, on presenting card 8 to card reader 14, data link 6 passes the electronic version of card holder figurecode 10 and trigger figurecode 12 to computer system 4 which sends back a signal indicating a match or no match. If a match signal is sent back, this is indicated on the screen 20 of information terminal 18. Computer system 4 could then ask the operator of terminal 18 to obtain additional information from the holder of card 8, such as a PIN number or what type of card is to be used, such as a particular bank credit card. This information could be entered by the clerk using a key pad 22 of terminal 18. Assuming the information matches, computer system 4 could then provide an appropriate authorization message to terminal 18.

Computer system 4 may be of the type dedicated to a single transaction system, such as a single type of bank credit card. In other cases, card 8 is a multi-use commercial transaction card used for different types of commercial transactions, such as two different types of bank credit cards, a debit card and a telephone calling card. In this case, computer system 4 may include, as shown in FIG. 1, an I.D. computer system 24, containing an electronic version of graphic figurecode 10 plus user I.D. numbers, user names, and auxiliary user I.D. verification information such as PIN numbers and mothers' maiden names. I.D. computer system 24 would then be coupled to two or more transactional computer systems 26 which would process the transaction based upon authorization obtained through I.D. computer system 24. In FIG. 1, transactional computer systems 26 are shown to be linked to data link 6 through I.D. computer system 24; this is only for purposes of illustration since computer systems 26 could, for example, be each linked directly to information terminal 18 independent of any data links between terminal 18 and I.D. computer system 24.

Figure 3:
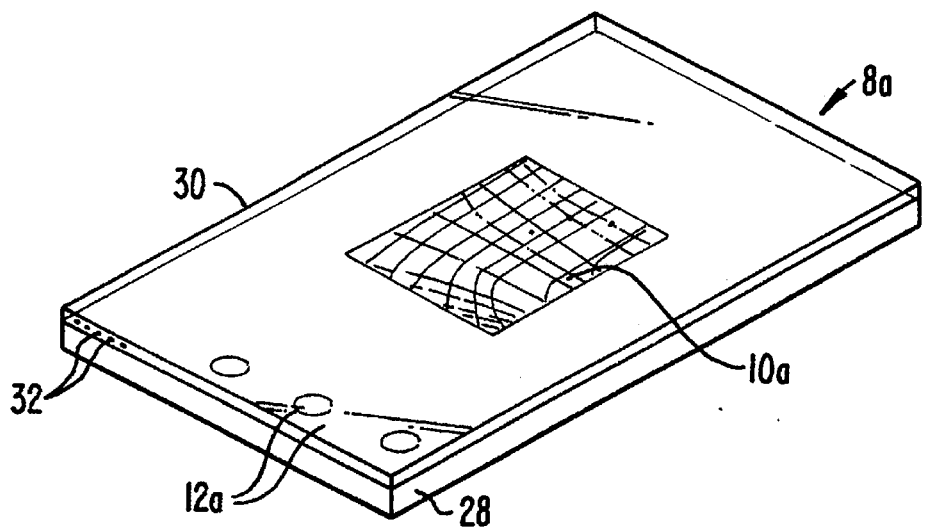
FIG. 3 shows a multi-use commercial transaction card similar to that of FIG. 2, but including a light blocking/transmitting layer to block unintended visual access to the card.

One of the reasons for providing graphic figurecodes in nonalphanumeric form is to make it difficult for someone to copy it without obtaining the actual card. One way to enhance this to, for example, prevent crooks from taking photographs of someone's card 8 through a telephoto lens, is to use a covering which visually obscures card holder figurecode 10 and trigger figurecode 12, except when being used. One way to do this would be to apply the graphic information to card 8 in a manner so that it is visible only to a particular light spectrum, such as ultraviolet light. Another would be to laminate card 8 with a prismatic surface so that the graphic information can be visually accessed only by looking at face 16 of card 8 at a particular angle. Another way is shown in FIG. 3. A card 8a has a base 28 and a light blocking/transmitting layer 30. Layer 30 is made of a material which is opaque under normal circumstances and, when coupled to a suitable electric source through terminals 32, becomes clear or at least transparent. Thus, graphic card holder figurecode 10a and trigger figurecode 12 will not be visible since terminals 32 will not be connected to an appropriate electric power source. With this type of system, card reader 14 would include an appropriate power source and complementary electric terminals so that, once card 8a is properly positioned on card reader 14, terminals 32 are coupled to the power source which transforms layer 30 from a dark, light-blocking condition to a clear or transparent, light-transmitting condition to permit visual access by card reader 14 to a card holder figurecode 10a and a trigger figurecode 12a.

In use, a graphic card holder figurecode 10 is generated, typically pseudo-randomly by a computer, for a card holder. Computer system 4 checks to ensure the newly chosen figurecode is not a match or a near match with any other stored or reserved card holder figurecodes. Card 8 is then made using the approved figurecode 10 and an electronic version of card holder figurecode 10 is stored in memory in computer system 4. Card 8 also has a trigger figurecode 12 to identify the place for computer system 4 to start searching for figurecode 8. Appropriate identifying information for the card holder, such as name, I.D. number, PIN number, etc. is also stored with the card holder's figurecode. To, for example, purchase a product the card holder places card 8 on card reader 14 which sends data to computer system 4. Computer system 4 can ask for more information to verify the user is the authorized card holder. For simple transactions, computer system 4 can transmit the card holder's name to terminal 18 for viewing by the clerk only on screen 20. The clerk could then ask the user his or her name; assuming the correct answer is given, the clerk can enter an I.D. verified code to permit the transaction to continue. I.D. verification information can also be requested of the user from a key pad accessible by the user or the clerk; this information could include the card holder's name, PIN number, mother's maiden name, date of birth, etc.

Figure 4:
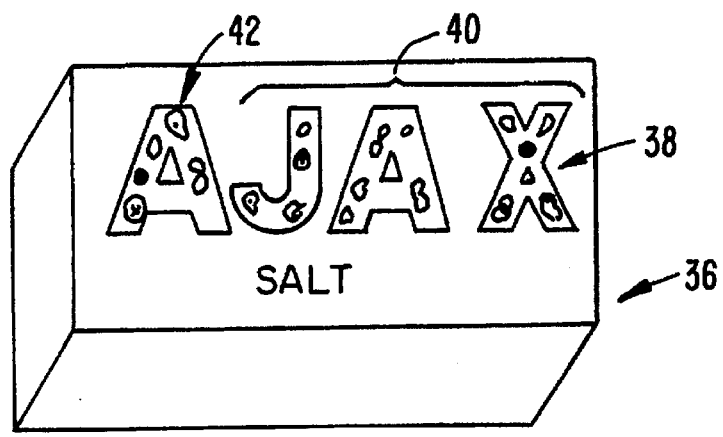
FIG. 4 illustrates a product in which the trademark incorporates I.D. and trigger figurecodes.
Figure 5:
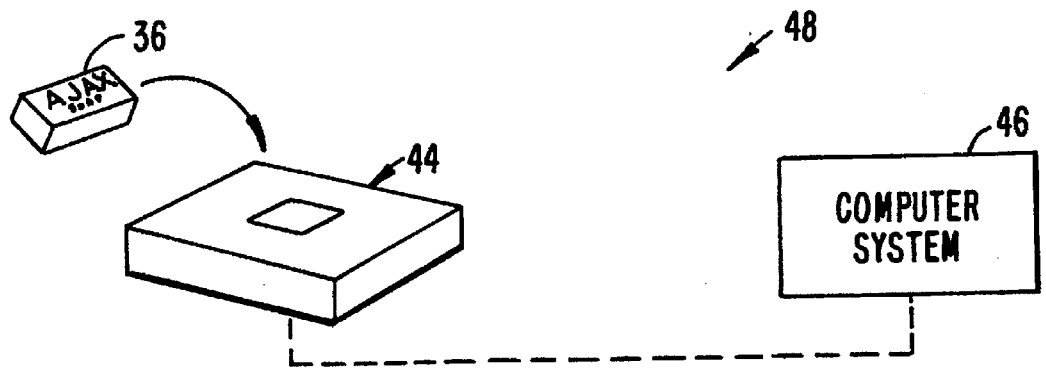
FIG. 5 is a simplified view showing a product information system in which information about the product of FIG. 4 can be obtained at the point of sale.

Another aspect of the invention will be described with reference to FIGS. 4 and 5. FIG. 4 illustrates a product 36 having a product identifier region 38, in this case the trademark AJAX for a brand of salt. In this case, the trademark itself includes graphic information which serves as an identification (I.D.) figurecode 40 and a trigger figurecode 42. Identification figurecode 40 serves the same purpose as a barcode; it identifies the particular product uniquely. An advantage of incorporating graphic figurecodes into the product identifier region 38 is that the clerk need not spend time trying to find out which of six sides of a package the barcode is on so that the barcode can be scanned. The trademark or other product identifier region 38 is almost always prominent to reduce the time it takes the clerk to find it. Instead of being incorporated into the letters of the trademark itself, an I.D. figurecode 40 and trigger figurecode 42 could be formed around the trademark, but still in the product identifier region 38 associated with the trademark. Figurecodes 40, 42 could be incorporated both into the trademark and around the trademark.

Trigger figurecode 42 is used to cause the automatic collection and storage of point-of-sale information regarding product 36. For example, a particular trigger figurecode 42 might include one or more of the following: date and time of sale, costs, form of payment, and zip code of store. Trigger figurecode 42 can be changed to accommodate what type of information the producer of product 36 wishes to collect at that time. Nothing special needs to be done since the price will be obtained by scanning I.D. figurecode 40; since trigger figurecode 42 is within the same region 38 as I.D. figurecode 40, it too will be scanned. FIG. 5 illustrates, in simplified form, passing product 36 over a scanner-type data input device, typically a scanner at a check-out counter, coupled to a computer system 46 which, together, constitute a product identification system 48.

Other modifications and variations can be made to the disclosed embodiments without departing from the subject of the invention as defined in the following claims.

What is claimed is:

1. A commercial transaction system comprising:
   a commercial transaction device including a fixed graphic figurecode uniquely corresponding to a device holder, said graphic figurecode having no discernable relationship to said device holder, said graphic figurecode being at least substantially non-alphanumeric;
   a computer system configured to store a stored electronic version of said graphic figurecode for said device holder and identification information for said device holder; and
   a data link operably coupling the commercial transaction device and the computer system, said data link comprising:
     a reader for the commercial transaction device adapted to access the graphic figurecode and transform said graphic figurecode into a read electronic version for comparison with the stored electronic version in said computer system; and
     an information terminal adapted for at least receiving information from the computer system.

2. The system according to claim 1 wherein the commercial transaction device is a commercial transaction card.

3. The system according to claim 2 wherein the commercial transaction card serves as one or more credit, debit, identification and bank automatic teller machine cards.

4. The system according to claim 1 wherein the graphic figurecode is a two-dimensional, visually discernable graphic figurecode.

5. The system according to claim 1 wherein the graphic figurecode includes no alphanumeric characters.

6. The system according to claim 1 wherein the computer system is adapted to store and manipulate transactional information associated with the commercial transaction device.

7. The system according to claim 1 wherein the computer system includes an identification verification computer system, which stores the stored electronic version of the graphic figurecodes, and a transactional computer system, which stores and manipulates transactional information associated with the commercial transaction device.

8. The system according to claim 1 wherein said data link includes commercial telephone system lines.

9. The system according to claim 1 wherein said reader is an optical reader.

10. The system according to claim 9 wherein said graphic figurecode is a visually discernable graphic figurecode and said optical reader uses light in the visible light spectrum to read the graphic figurecode.

11. The system according to claim 1 further comprising means for selectively visually obscuring the graphic figurecode.

12. The system according to claim 11 wherein the obscuring means includes means for forming the graphic figurecode so to be detectable using infrared light only.

13. The system according to claim 1 wherein the information terminal is also adapted to transmit information to the computer system.

14. A method for authenticating a commercial transaction device provided by a user in a commercial transaction comprising the following steps:
   creating a chosen fixed graphic figurecode uniquely corresponding to the user while:
     ensuring that the chosen graphic figurecode has no discernable relationship to the user; and
     using substantially no alphanumeric characters; reading the chosen graphic figurecode;

creating a read electronic version of the chosen graphic figurecode;

transmitting the read electronic version of the chosen graphic figurecode to a computer system;

comparing the read electronic version of the chosen graphic figurecode to a plurality of stored electronic versions of a plurality of graphic figurecodes to determine if the stored electronic version of the chosen graphic figurecode matches one of the stored electronic versions of the plurality of graphic figurecodes; and providing either a match/no match signal by the computer system according to whether there is or is not a match as a result of the comparing step.

15. The method according to claim 14 wherein the creating step creates a two-dimensional, visually discernable chosen graphic figurecode.

16. The method according to claim 14 wherein the reading step is carried out at a point of a purchase.

17. The method according to claim 14 wherein the transmitting step is carried out over commercial telephone system lines.

18. The method according to claim 14 wherein the reading step is carried out using visible light.

19. The method according to claim 14 wherein the match/no match signal is provided to an information terminal.

20. The method according to claim 14 wherein:

the transmitting step is carried out using a computer system with an identification computer system, which conducts the comparing step, and a transactional computer system; and the match or no match signal is provided to at least the transactional computer system.

21. A product information system compromising:

a product identifier region for a chosen product, said region including a product trademark;

a graphic product I.D. figurecode, unique to and identifying the chosen product, incorporated into the product identifier region;

a computer system configured to store a stored electronic version of said graphic product I.D. figurecode; and a data link operably coupling the chosen product and the computer system, said data link comprising:

a reader adapted to access the graphic product I.D. figurecode and transform said graphic product I.D. figurecode into a read electronic version for use by said computer system; and an information terminal adapted for at least receiving information from the computer system.

22. The product information system according to claim 21 wherein the product I.D. figurecode is other than a barcode.

23. The product information system according to claim 21 further comprising a graphic trigger figurecode incorporated into the product identifier for providing an information-gathering instruction to the computer system relative to said chosen product.

24. The product information system according to claim 21 wherein said information gathering instruction includes instructions to record transactional information.

25. The product information system according to claim 21 wherein the product I.D. figurecode is incorporated into the product trademark.

26. A method for obtaining point-of-sale information about a product comprising the following steps:

providing a unique graphic I.D. figurecode at a product identifier region of a chosen product;

providing a graphic trigger figurecode at the product identifier region of the chosen product, paid trigger figurecode corresponding to selected point-of-sale information to be recorded for the chosen product;

reading the I.D. and trigger figurecodes from a chosen product using a data input device; and recording point-of-sale information about the chosen product according to trigger figurecode using a computer system operably coupled to the data input device.

27. The method according to claim 26 wherein the I.D. figurecode-providing step is carried out using a region encompassed by the product trademark as the product identifier region.

28. The method according to claim 27 wherein the I.D. figurecode-providing step is carried out by incorporating the I.D. figurecode into the design of the product trademark.

29. The method according to claim 26 wherein the trigger figurecode-providing step is carried out using a trigger figurecode corresponding to at least one of the following: date and time of sale, cost, form of payment, zip code of store.

30. The method according to claim 26 wherein the I.D. figurecode is other than a bar figurecode.

31. A commercial transaction system comprising:

a commercial transaction device comprising:

a graphic figurecode uniquely corresponding to a device holder, said graphic figurecode having no discernable relationship to said device holder, said graphic figurecode being at least substantially non-alphanumeric; and a graphic trigger figurecode corresponding to a chosen start search location of a plurality of start search locations in the computer system to aid the search by the computer system for the stored electronic version of the graphic figurecode thus saving search time;

a computer system configured to store a stored electronic version of said graphic figurecode for said device holder and identification information for said device holder; and a data link operably coupling the commercial transaction device and the computer system, said data link comprising:

a reader for the commercial transaction device adapted to access the graphic figurecode and transform said graphic figurecode into a read electronic version for comparison with the stored electronic version in said computer system; and an information terminal adapted for at least receiving information from the computer system.

32. The system according to claim 31 wherein the graphic trigger figurecode is a 2-dimensional, visually discernable graphic trigger figurecode with an alphanumeric character.

33. A commercial transaction system comprising:

a commercial transaction device including a graphic figurecode uniquely corresponding to a device holder, said graphic figurecode having no discernable relationship to said device holder, said graphic figurecode being at least substantially non-alphanumeric;

a computer system configured to store a stored electronic version of said graphic figurecode for said device holder and identification information for said device holder;

a data link operably coupling the commercial transaction device and the computer system, said data link comprising:

a reader for the commercial transaction device adapted to access the graphic figurecode and transform said graphic figurecode into a read electronic version for comparison with the stored electronic version in said computer system; and an information terminal adapted for at least receiving information from the computer system; and a selective light blocking/transmitting layer overlying the graphic figurecode, said layer including an electric terminal so that when said electric terminal is coupled to a chosen source of electricity, said layer transmits light therethrough so to permit light access to the graphic figurecode and, when the electric terminal is disconnected from the chosen source of electricity, said layer effectively blocks light transmission therethrough to visually obscure the graphic figurecode.

* * * * *